US012759551B2

(12) United States Patent
Bai et al.

(10) Patent No.: US 12,759,551 B2
(45) Date of Patent: Oct. 13, 2026

(54) METHOD AND APPARATUS OF LANE-LEVEL ROAD CONGESTION APPLICATION TO ENHANCE VEHICLE NAVIGATION

(71) Applicant: GM Global Technology Operations LLC, Detroit, MI (US)

(72) Inventors: Fan Bai, Ann Arbor, MI (US); Michael Wahlstrom, Wolverine Lake, MI (US); Donald K. Grimm, Utica, MI (US); Paul E. Krajewski, Warren, MI (US); Richard Gordon, Canton, MI (US); Philip Mallinger, Shelby Township, MI (US); Jason R. Ekelmann, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 452 days.

(21) Appl. No.: 18/359,983

(22) Filed: Jul. 27, 2023

(65) Prior Publication Data

US 2025/0033640 A1 Jan. 30, 2025

(51) Int. Cl.

*B60W 30/16* (2020.01)
*B60W 30/18* (2012.01)
*B60W 40/04* (2006.01)
*G08G 1/01* (2006.01)

(52) U.S. Cl.

CPC ...... *B60W 30/16* (2013.01); *B60W 30/18163* (2013.01); *B60W 40/04* (2013.01); *G08G 1/0112* (2013.01); *B60W 2554/80* (2020.02)

(58) Field of Classification Search

CPC .......... B60W 30/16; B60W 30/18163; B60W 40/04; B60W 2554/80; G08G 1/0112; G08G 1/167; G01C 21/3423

See application file for complete search history.

(56) References Cited

U.S. PATENT DOCUMENTS

| | | | | |
|---|---|---|---|---|
| 9,672,734 | B1 * | 6/2017 | Ratnasingam | G08G 1/096741 |
| 10,895,468 | B2 * | 1/2021 | Yang | G08G 1/096805 |
| 11,749,108 | B2 * | 9/2023 | Al-Nadawi | G08G 1/0133 340/934 |
| 11,993,281 | B2 * | 5/2024 | Wray | B60W 60/0053 |
| 2007/0050133 | A1 * | 3/2007 | Yoshikawa | G01C 21/3461 701/437 |
| 2008/0300778 | A1 * | 12/2008 | Kuznetsov | G08G 1/096888 701/532 |
| 2013/0275033 | A1 * | 10/2013 | Bastiaensen | G01C 21/26 701/119 |
| 2015/0345967 | A1 | 12/2015 | Meuleau | |

(Continued)

OTHER PUBLICATIONS

El Joubari et al., "Markov Chain Mobility Model for Multi-lane Highways", Mobile Networks and Applications, Feb. 21, 2022, p. 1286-1298, vol. 27. United States.

*Primary Examiner* — Angelina M Shudy
(74) *Attorney, Agent, or Firm* — Vivacqua Crane, PLLC

(57) ABSTRACT

A method to incorporate lane level road congestion to enhance vehicle navigation includes: collecting vehicle data from a fleet of vehicles; identifying a lane level distribution of multiple vehicles operating on a road having multiple lanes including a host vehicle; comparing the lane level distribution against a non-congested lane of the road; and identifying if a lane level congestion is occurring in at least one of the multiple lanes.

14 Claims, 8 Drawing Sheets

(56) References Cited

U.S. PATENT DOCUMENTS

| | | | | |
|---|---|---|---|---|
| 2016/0238404 | A1* | 8/2016 | Okada | G01C 21/3658 |
| 2016/0307444 | A1* | 10/2016 | Koshizen | G08G 1/096791 |
| 2017/0089717 | A1* | 3/2017 | White | G08G 1/0112 |
| 2017/0352262 | A1* | 12/2017 | Xu | G08G 1/0133 |
| 2018/0122231 | A1* | 5/2018 | Modi | G06F 16/444 |
| 2018/0182238 | A1* | 6/2018 | Fowe | G08G 1/0112 |
| 2019/0310100 | A1* | 10/2019 | Yang | G01C 21/3461 |
| 2019/0329770 | A1* | 10/2019 | Rajab | H04W 4/46 |
| 2020/0035092 | A1* | 1/2020 | Rajab | B60W 30/12 |
| 2020/0312129 | A1* | 10/2020 | Oyama | G08G 1/096725 |
| 2021/0213951 | A1* | 7/2021 | Dobi | G08G 1/0133 |
| 2022/0207993 | A1* | 6/2022 | Fowe | G06N 7/01 |
| 2022/0276653 | A1* | 9/2022 | Wray | G05D 1/0214 |
| 2023/0033672 | A1* | 2/2023 | Nayak | G01C 21/3697 |
| 2023/0243661 | A1* | 8/2023 | Huang | G01C 21/3461<br>701/482 |
| 2023/0368675 | A1* | 11/2023 | Gardner | G08G 1/0116 |
| 2024/0067214 | A1* | 2/2024 | Nagasaka | G01C 21/3691 |
| 2024/0067227 | A1* | 2/2024 | Goto | B60W 60/0051 |
| 2024/0242596 | A1* | 7/2024 | Kwon | G08G 1/0116 |
| 2024/0246567 | A1* | 7/2024 | Kume | A61B 5/18 |
| 2024/0262364 | A1* | 8/2024 | Kumazaki | B60W 30/18163 |
| 2025/0100553 | A1* | 3/2025 | Cardinal | G08G 1/096716 |
| 2025/0316160 | A1* | 10/2025 | Zeiynali Farid | G08G 1/0125 |
| 2026/0009653 | A1* | 1/2026 | Liu | G01C 21/3446 |

* cited by examiner

METHOD AND APPARATUS OF LANE-LEVEL ROAD CONGESTION APPLICATION TO ENHANCE VEHICLE NAVIGATION

INTRODUCTION

The present disclosure relates to autonomous vehicle navigation systems.

Lane-level congestion estimation is needed for many customer-facing applications including navigation, road anomaly detection, and accident reporting. Present systems assess road network congestion but lack lane traffic distribution information to identify lane congestion in high fidelity.

Thus, while current systems and methods for autonomous vehicle navigation achieve their intended purpose, there is a need for a new and improved system and method to identify lane-level road congestion.

SUMMARY

According to several aspects, a method for collecting vehicle data from a fleet of vehicles; identifying a lane level distribution of multiple vehicles operating on a road having multiple lanes including a host vehicle; comparing the lane level distribution against a non-congested lane of the road; and identifying if a lane level congestion is occurring in at least one of the multiple lanes.

In another aspect of the present disclosure, the method includes: identifying at least one vehicle defining a lead actor vehicle ahead of the host vehicle moving slower than the host vehicle defining a slowdown of vehicle traffic; and increasing a deceleration profile for the host vehicle based on a planned deceleration of the lead actor vehicle.

In another aspect of the present disclosure, the method includes: operating sensors of the host vehicle to detect the lead actor vehicle; and initiating a deceleration of the host vehicle upon initial detection of the lead actor vehicle.

In another aspect of the present disclosure, the method includes: modifying a follow distance between the host vehicle and the lead actor vehicle; and continuing to follow the lead actor vehicle at the follow distance until after the host vehicle reaches the slowdown of vehicle traffic ahead of the host vehicle.

In another aspect of the present disclosure, the method includes: performing a lane level load balancing to mitigate against the non-congested lane identified by the host vehicle becoming congested; and creating multiple lane route options for multiple vehicles on the road including the host vehicle.

In another aspect of the present disclosure, the method includes: applying an equal lane route strategy to create the multiple lane route options, wherein top choices of the multiple lane route options are identified through an algorithm; applying utility-function metrics wherein an equal weight is assigned to individual ones of the multiple lane route options; randomizing the multiple lane route options and assigning a probability to individual ones of the multiple lane route options; and assigning one of the multiple vehicles to one of the multiple lane route options.

In another aspect of the present disclosure, the method includes: applying a proportional lane route strategy to create the multiple lane route options wherein the multiple lane route options are identified through an algorithm (which may include one of a Dijkstra algorithm or a Bellman-Ford algorithm); using utility-function metrics including identifying for individual ones of the multiple lane route options a designed capacity and a current usage traffic volume; assigning a different weight to different ones of the multiple lane route options based on an available traffic volume; and randomizing assignment of a probability to an individual one of the multiple vehicles and one of the multiple lane route options.

In another aspect of the present disclosure, the method includes: identifying a slowing vehicle defining a lead actor vehicle ahead of the host vehicle; and decelerating the host vehicle while maintaining a following distance to the lead actor vehicle.

In another aspect of the present disclosure, the method includes performing a trade-off analysis between a shortest travel time having multiple vehicle lane changes to accomplish to minimize an impact of one or more road congestion locations ahead of the host vehicle, and a customer comfort maximized by minimizing a quantity of the vehicle lane changes and by a trade-off through a utility function combining the travel time or the estimated time of arrival and the customer comfort together.

In another aspect of the present disclosure, the method includes applying a process to identify a system steady-state estimation.

According to several aspects, a method to incorporate road congestion for enhanced vehicle navigation, comprises: conducting an analysis of a current distribution of multiple vehicles in front of or proximate to a host vehicle traveling on a road having multiple vehicle lanes; assessing a vehicle clustering of at least one of the multiple vehicle lanes forward of the host vehicle; comparing results of the analysis and the vehicle clustering to a non-congested vehicle lane profile to distinguish a lane level distribution of the multiple vehicles in front of or proximate to the host vehicle; generating a prediction of at least one congested lane ahead of the host vehicle using the lane level distribution; and carrying out a trade-off analysis providing an estimated travel time (TT) of the host vehicle to a predetermined destination including predicting a total quantity of lane change maneuvers required by the host vehicle to minimize interaction with the at least one congested lane until reaching the predetermined destination.

In another aspect of the present disclosure, the method includes predicting the at least one congested lane using a process including a Markov Chain process.

In another aspect of the present disclosure, the method includes determining a system steady state estimation.

In another aspect of the present disclosure, the method includes incorporating first and second lane selection functions including: selecting a travel lane of the host vehicle in a first lane selection function based on both saved or input habits of a user of the host vehicle and a comfort level of the user of the host vehicle; and developing a lane selection in a second lane selection function based on planning data developed to prepare to exit the host vehicle at an upcoming road exit.

In another aspect of the present disclosure, the method includes: identifying a target lane for the host vehicle to transfer into ahead of reaching an exit from the road; and selecting one of adapting a vehicle speed of the host vehicle and moving the host vehicle to the target lane sooner in time to take the exit.

In another aspect of the present disclosure, the method includes providing visual indications of road segment congestion to a user of the host vehicle using multiple segments individually having a distinct color and a line width together indicating a non-congested condition, an increased congestion condition and a congested condition, the host vehicle automatically adjusting a driving path in view of the visual indications of road segment congestion.

In another aspect of the present disclosure, the method includes: directing a first or component A to issue a lane level congestion notification to a user or an operator of the host vehicle; providing a second or component B to perform lane level congestion-aware navigation; incorporating a third or component C to perform lane level load balancing; and including a fourth or component D directed to maintaining a lane level dynamic following distance.

According to several aspects, a method to incorporate lane level road congestion to enhance vehicle navigation comprises: providing individualized lane guidance to road users based on detected traffic distribution of lanes on a road to maximize traffic flow through a congested area; presenting lane profile data to the road users for consideration or to be used by autonomous vehicles as part of a vehicle behavior planning; presenting a road map depicting a predetermined portion of the road for vehicle travel having multiple lanes; depicting one or more congestion symbols on the road map if the congested area is identified in the predetermined portion of the road; and presenting a recommended vehicle travel path into one of the multiple lanes representing a recommended travel lane to minimize travel disruption in the congested area.

In another aspect of the present disclosure, the method includes: projecting at least one travel delay symbol and at least one estimated time of arrival (TT) symbol on the road map if the congested area is identified in the predetermined portion of the road; and identifying multiple lane changes to maximize vehicle travel through the congested area.

In another aspect of the present disclosure, the method includes: identifying a selected one of a first lane, a second lane and a third lane as the recommended travel lane on the predetermined portion of the road; and visually presenting directional indicators, for example arrows directed toward the recommended travel lane on individual ones of the first lane, the second lane and the third lane not identified as the recommended travel lane.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
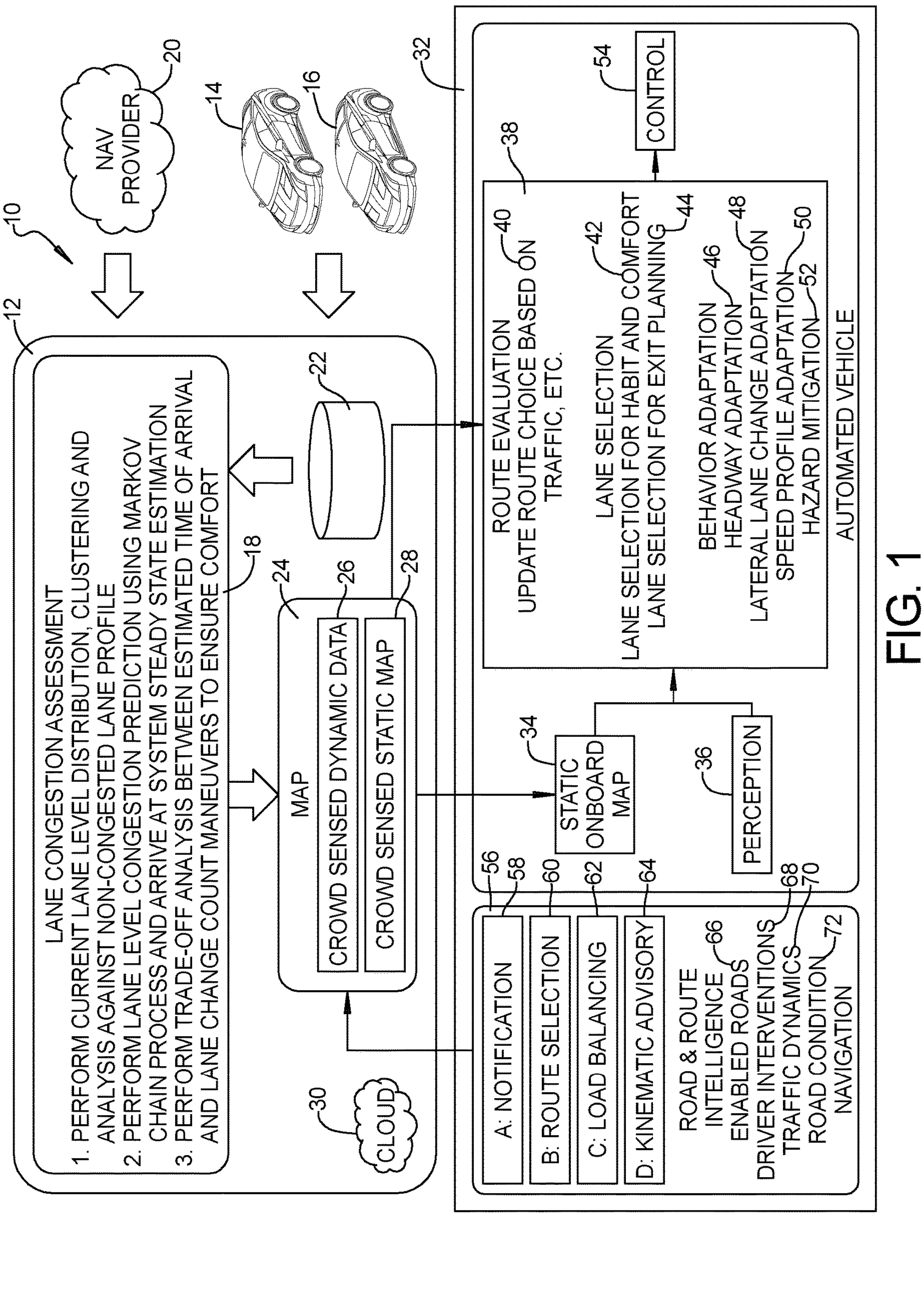
FIG. 1 is a system diagram of a system to incorporate lane level road congestion to enhance vehicle navigation according to an exemplary aspect.

Referring to FIG. 1, a system to incorporate lane level road congestion to enhance vehicle navigation 10 is divisible into two system sections. In a first system section 12 located for example in a cloud computing network, large volumes of vehicle data are collected and analyzed to assess if vehicle roadway lane congestion is occurring ahead of a first or host vehicle 14, which according to several aspects defines an autonomous vehicle (AV), and at least one second vehicle 16 which may define a lead actor vehicle ahead of the host vehicle 14. In an assessment portion 18, three performance evaluations are obtained. Data required for conducting the assessment portion 18 may be provided by a navigation provider 20 which may contain roadway status, routing status and global positioning system (GPS) data. Calculations performed during the assessment portion 18 may be performed using a computer 22, which may by located in the cloud based system or in the host vehicle 14.

During a first of the three performance evaluations, an analysis is conducted of a current lane level distribution of multiple vehicles in front of or proximate to the host vehicle 14, together with a vehicle clustering assessment of at least one vehicle lane forward of the host vehicle 14. Results of the first performance evaluation are compared to a non-congested vehicle lane profile to distinguish lane level distribution of the vehicles in front of or proximate to the host vehicle 14.

During a second of the three performance evaluations a lane level congestion prediction is performed which may be made using a process such as a Markov Chain process. It is noted other processes may also be used within the scope of the present disclosure. The lane level congestion prediction is performed to determine a system steady state estimation.

During a third of the three performance evaluations of the assessment portion 18, a trade-off analysis is conducted providing the estimated travel time (TT) or an estimated time of arrival (ETA) of the host vehicle 14 to a predetermined destination which includes predicting total lane change count maneuvers made by the host vehicle 14 until the predetermined destination is reached. The total lane change maneuvers are applied to ensure a predetermined vehicle user comfort is maintained during host vehicle travel which is described in greater detail herein.

Control of the system to incorporate lane level road congestion to enhance vehicle navigation 10 may be performed using an individual device such as a processor, a software component, an on-board computer or a remote located computer, hereinafter collectively referred to as the computer 22. The computer 22 may be deployed in the host vehicle 14 with perception capabilities or may be remotely located. The computer 22 is a non-generalized, electronic control device having a preprogrammed digital controller or processor, memory or non-transitory computer readable medium used to store data such as control logic, software applications, instructions, computer code, data, lookup tables, etc., and a transceiver or input/output ports. The computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium excludes wired, wireless, optical, or other communication links that transport transitory electrical or other signals. The non-transitory computer readable medium includes media where data can be permanently stored and media where data can be stored and later overwritten, such as a rewritable optical disc or an erasable memory device. Computer code includes any type of program code, including source code, object code, and executable code.

Results of the above three performance evaluations are forwarded to a map 24. The map 24 may include crowd sensed dynamic data 26 and a crowd sensed static map 28. Data collected or generated by the first system section 12 may be stored in and retrieved from a cloud computing network 30.

Following generation and collection of data by the first system section 12, additional analyses are performed by a second system section 32 which is located in the host vehicle 14. The first system section 12 communicates data with the second system section 32. For example, data from the crowd sensed static map 28 is communicated to a vehicle lane static onboard map 34. An output of a perception module 36 collecting data using sensors of the host vehicle 14 for example, and the crowd sensed dynamic data 26 together with requested data of the static onboard map 34 are together forwarded to an evaluation and selection module 38. The evaluation and selection module 38 also receives requested data from the map 24.

The evaluation and selection module 38 performs several functions. A first function of the evaluation and selection module 38 defines a route evaluation 40 wherein a route choice based on detected traffic is updated. A second function of the evaluation and selection module 38 defines first and second lane selection functions including a first lane selection function 42 wherein a travel lane of the host vehicle 14 is selected based on both saved or input habits of the user or passengers of the host vehicle 14 and a comfort level of the operator of the host vehicle 14 is selected. In a second lane selection function 44 a lane selection is developed based on planning data developed to prepare to exit the host vehicle 14 at an upcoming road exit. A third function of the evaluation and selection module 38 defines behavior adaptations including a headway adaptation 46, a lateral lane change adaptation 48, a speed profile adaptation 50 and a hazard mitigation 52. Data collected or analyzed by the second system section 32 is forwarded as vehicle control instructions to a vehicle control module 54.

Also provided in the second system section 32 is a vehicle navigation system 56 in communication with map 24. The vehicle navigation system 56 provides a notification unit 58 to provide system notifications to the operator of the host vehicle 14, a route selection unit which allows the operator to identify preferred routes, a load balancing unit 62 described in in reference to FIG. 1, and a kinematic advisory unit 64 identifying suggested vehicle speed and vehicle-to-vehicle following distance and the like.

A road and route intelligence unit of the vehicle navigation system 56 provides up-to-date road and route data to the user or operator of the host vehicle 14. This data includes data identified relative to enabled roads 66 defining roads which are available for vehicle travel, driver interventions 68 which identify to the operator of the host vehicle 14 when and if for example a driver takeover of operation of the automated vehicle defining the host vehicle 14 may be required, traffic dynamics 70 to provide up-to-date changes occurring on the road including for example accident reports, and road conditions 72 which provide up-to-date changes to road conditions which may occur for example due to weather conditions and the like.

Figure 2:
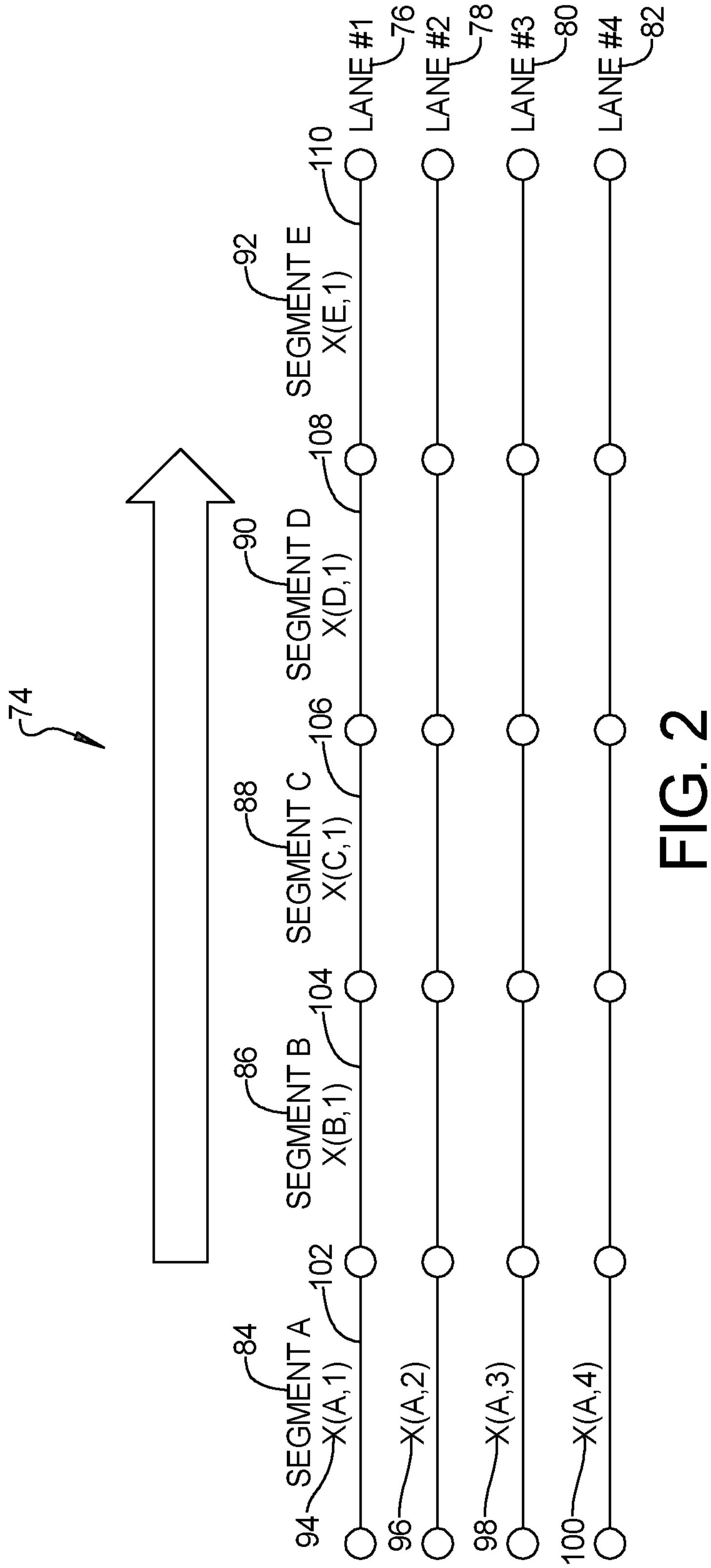
FIG. 2 is a road segment diagram for the system of FIG. 1.

Referring to FIG. 2 and again to FIG. 1, an exemplary road segment diagram 74 identifies how an exemplary road portion in the path of travel of the host vehicle 14 may be delineated. By applying the large volume of lane data and lane-level participation received and analyzed, lane-level congestion status may be provided for use by the operator of host vehicle 14 as well as the vehicle navigation system 56. An exemplary road may include a first lane 76, a second lane 78, a third lane 80 and a fourth lane 82. Each of the lanes is divisible into segments, which may include a first or A segment 84, a second or B segment 86, a third or C segment 88, a fourth or D segment 90 and a fifth or E segment 92.

The individual segments of the collection of lanes may be further designated, such as the first or A segment 84 of the first lane 76 may be assigned a designation 94 defined as X(A,1), the first or A segment 84 the second lane 78 may be assigned a designation 96 defined as X(A,2), the first or A segment 84 the third lane 80 may be assigned a designation 98 defined as X(A,3), and the first or A segment 84 the fourth lane 82 may be assigned a designation 100 defined as X(A,4).

Visual indications of road segment congestion may be provided to the operator of the host vehicle 14. For example, the first or a segment 84 of the first lane 76 may be presented as a lane segment 102 having a first color or line width indicating a non-congested condition, the second or B segment 86 of the first lane 76 may be presented as a lane segment 104 having a second color or line width indicating an increased congestion condition, the third or C segment 88 of the first lane 76 may be presented as a lane segment 106 having the second color or line width indicating the increased congestion condition, the fourth or D segment 90 of the first lane 76 may be presented as a lane segment 108 having a third color or line width indicating a congested condition and the fifth or E segment 92 of the first lane 76 may be presented as a lane segment 110 having the third color or line width indicating the congested condition. The host vehicle 14 may automatically adjust a driving path or the operator of the host vehicle 14 may manually adjust the vehicle driving path in view of the visual indications provided by the road segment diagram 74.

According to several aspects, the system to incorporate lane level road congestion to enhance vehicle navigation 10 may be divisible into multiple components. For example, the system may be divisible into a component A directed to lane level congestion notification to the user or operator, a component B directed to lane level congestion-aware navigation, a component C directed to lane level load balancing and a component D directed to lane level dynamic following distance. Individual ones of the components are discussed below.

Figure 3:
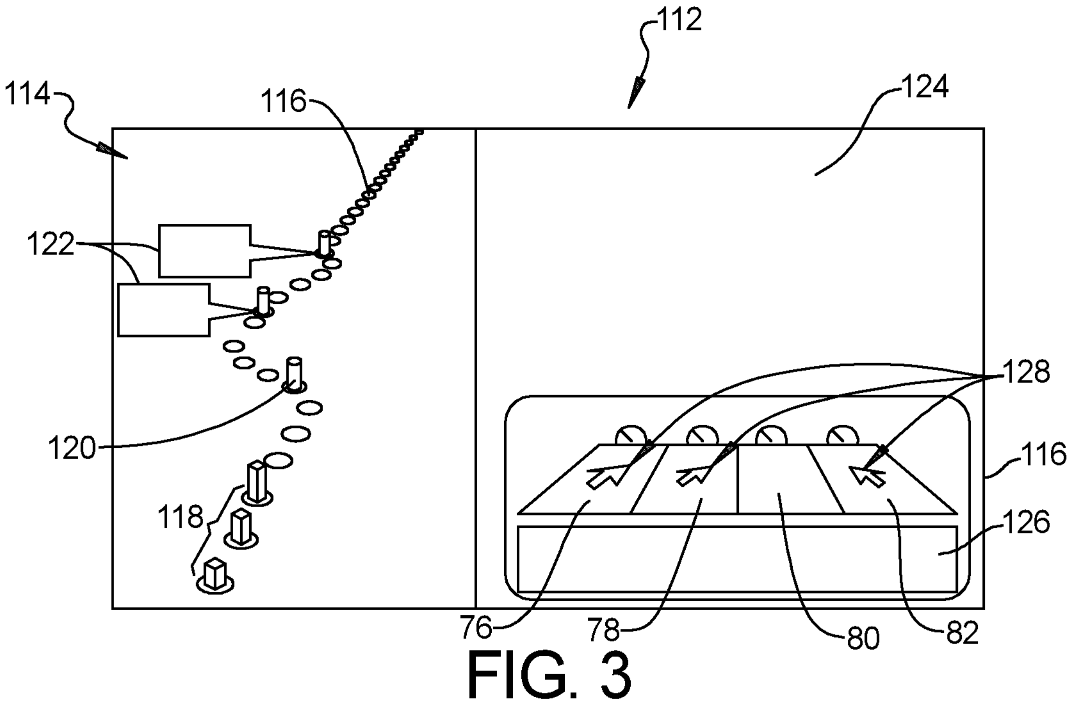
FIG. 3 is a map presentation generated by the system of FIG. 1.

Referring to FIG. 3, based on detected traffic distribution of lanes on a roadway, individualized lane guidance is provided to road users to maximize traffic flow through a congested area. Lane profile data may be presented to users or operators other than the host vehicle 14 for consideration or used by AVs as part of behavior planning. Component A of the system to incorporate lane level road congestion to enhance vehicle navigation 10 defining lane level congestion notification may be presented as a road map 112 depicting a predetermined portion of a road 116 for host vehicle 14 travel. If road congestion is identified in the predetermined portion of the road 116 the road map 112 will depict one or more congestion symbols 118. As the congestion clears ahead of the congested travel portion, travel delay symbols 120 may be presented as well as one or more TT symbols 122. A recommendation window 124 may be opened over the road map 112 to further alert the user or operator of host vehicle 14 of recommended lane changes to maximize traffic flow through the congested area. For example, the recommendation window 124 may visually display a slow traffic warning bar 126. In addition, individual recommended directional arrows 128 may be presented on a presentation of the road 116, for example on individual ones of the first lane 76, the second lane 78 and the fourth lane 82 to visually present a recommended vehicle travel path into the third lane 80 representing a recommended travel lane to minimize travel disruption in the congested area.

Figure 4:
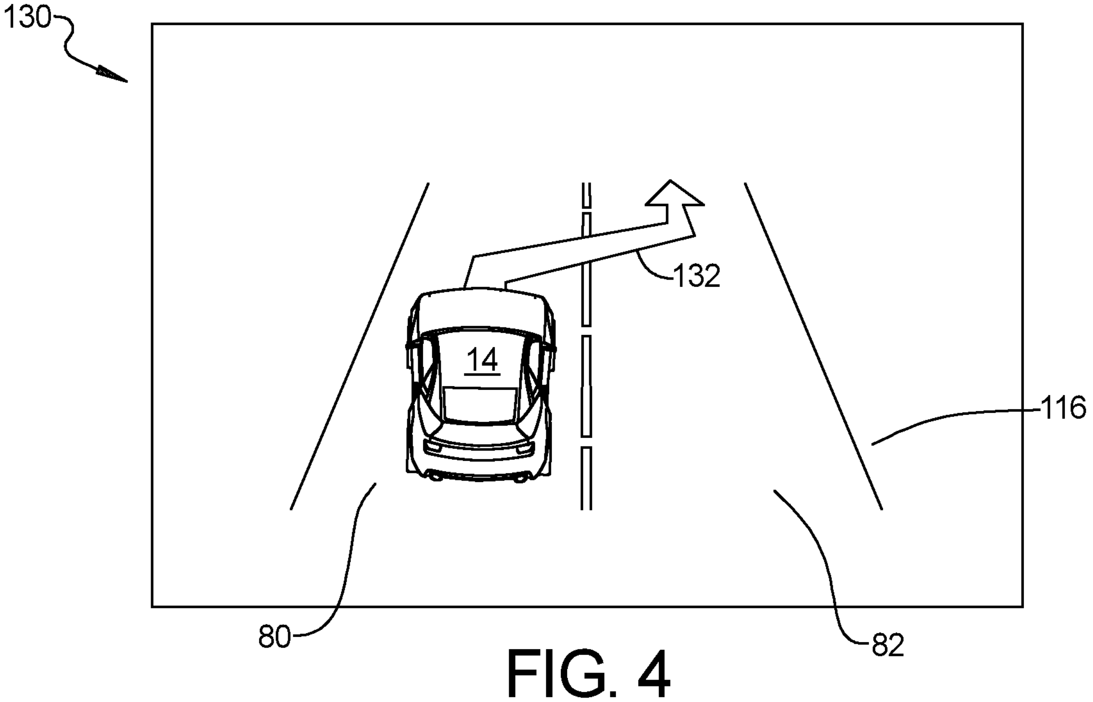
FIG. 4 is a road lane presentation generated by the system of FIG. 1.

Referring to FIG. 4 and again to FIG. 3, component A of the system to incorporate lane level road congestion to enhance vehicle navigation 10 defining lane level congestion notification may further include a lane change recommendation identifying an upcoming exit for the host vehicle 14 to take. FIG. 4 presents the predetermined portion of the road 116 having superimposed onto the predetermined portion of the road 116 the third lane 80 in which the host vehicle 14 is currently travelling and the fourth lane 82. A lane change direction arrow 132 is superimposed to visually indicate to the user or operator the recommended lane change from the third lane 80 to the fourth lane 82 which will permit exit from the road 116.

Referring to FIG. 5 and again to FIG. 2, component B of the system to incorporate lane level road congestion to enhance vehicle navigation 10 defining lane level congestion-aware navigation may be presented on an exemplary road segment diagram 134 having lane presentation data similar to the road segment diagram 74 discussed above in reference to FIG. 2. Once the lane-level congestion status is known, an AV routing engine may develop a lane selection strategy presented as a first suggested route 136 that strictly minimizes TT. The user or operator may elect to follow the first suggested route 136 as this route selects segments of the road lanes having minimal or no identified congestion. Following the first suggested route 136 may therefore minimize vehicle stop-and-go times and provide substantially continuous motion in the available travel lanes.

Figure 5:
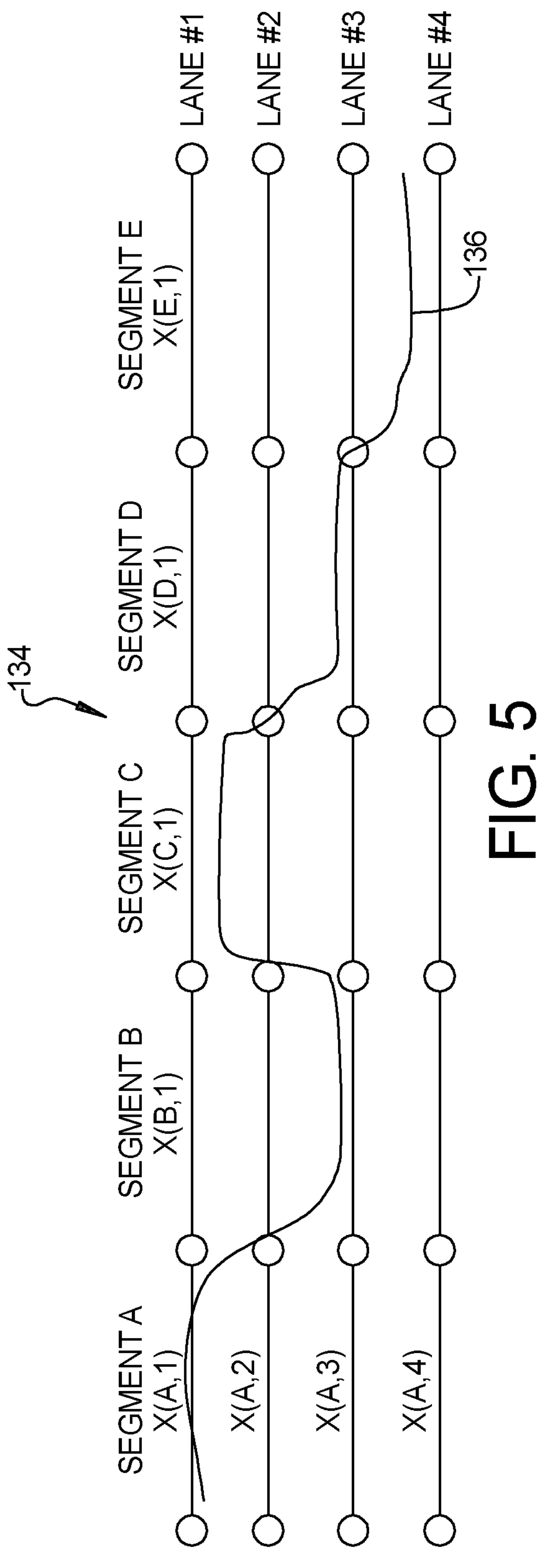
FIG. 5 is a road segment diagram modified from FIG. 2 to identify a comfort route having minimized lane changes.
Figure 6:
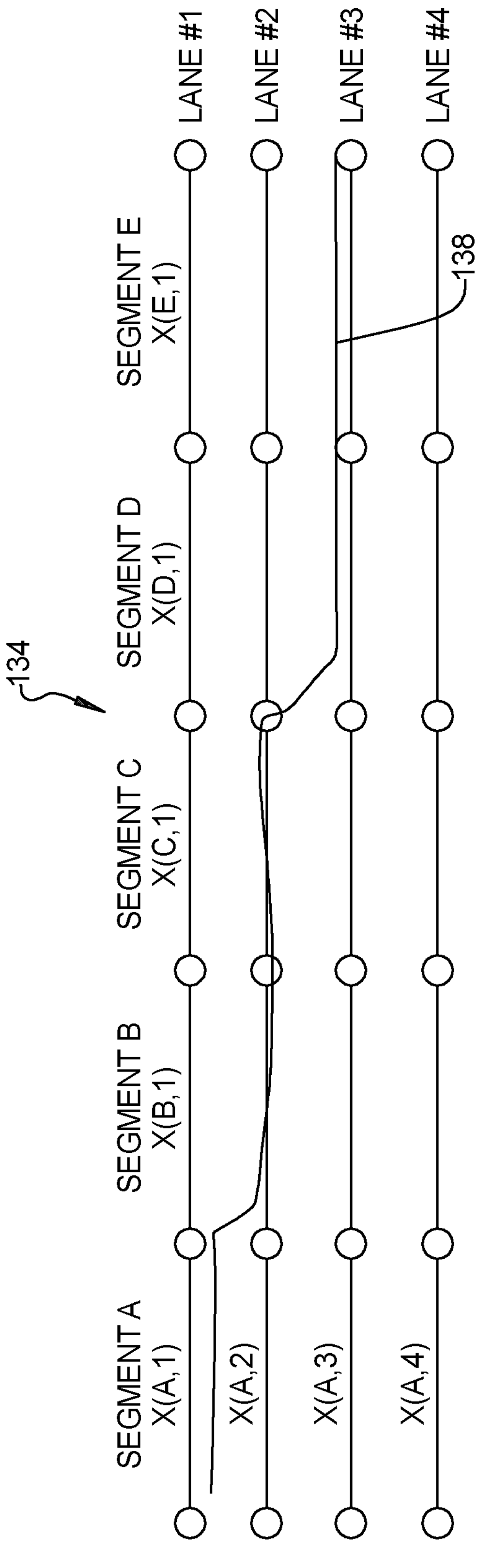
FIG. 6 is a road segment diagram modified from FIG. 6 to identify a vehicle route having an improved TT.

Referring to FIG. 6 and again to FIG. 5, a further application of component B generates a second suggested route 138 also presented on the exemplary road segmentation diagram 134. By focusing on the TT using the first suggested route 136 discussed above with respect to FIG. 5, an uncomfortable ride experience such as making too many lane changes might result. To mitigate against this possibility, according to several aspects, the lane-level TT or the estimated time of arrival and the passenger comfort are balanced as a trade-off, with the customer comfort maximized by minimizing a quantity of the vehicle lane changes and by a trade-off through a utility function combining the travel time or the estimated time of arrival and the customer comfort together. In this aspect of component B fewer lane changes are required by following the second suggested route 138 than by following the first suggested route 136 while also achieving a minimal travel time. Following the second suggested route 138 therefore extends the lane-level TT while improving passenger comfort.

Equations 1 or 2 below provide exemplary equations which may be used for calculations required to implement component B. For example, on a lane #i in a road segment j, rather than using a travel time $t_{i,j}$ a utility function U i,j may be applied to characterize the travel time value and is used as a metric for navigation routing. Here, $U_{i,j}$ is the utility function to characterize the metric in the road segment j and lane l, by jointly considering ETA time $t_{i,j}$ and comfort indicator $L_{i,j}$ through the mathematical formulation in Equation 1 or Equation 2.

$$U_{i,j} = f(t_{i,j}, L_{i,j}) = k_1 t_{i,j} + k_2 L_{i,j} \quad \text{Equation 1}$$

$$U_{i,j} = f(t_{i,j}, L_{i,j}) = k_1 l_n(ti_{,j}) + k_2 l_n(L_{i,j}) \quad \text{Equation 2}$$

For equations 1 and 2 above, the use of a segmented ETA ($t_{ij}$) or TT as the metric for routing decisions is replaced by the use of (1) a Lane/Segment+(2) the utility function $U_{ij}$ as the metric, which are plugged into a shortest-path algorithm, for example the Dijkstra algorithm or the Bellmen-Ford algorithm to compute the route/lane selection strategy. Here, the travel time estimates of route segments are aggregated to an estimated time or arrival for the journey. It is noted algorithms identified herein, including the Dijkstra algorithm and the Bellmen-Ford algorithm are provided as examples only. Multiple other algorithms may also be used within the scope of the present disclosure.

Figure 7:
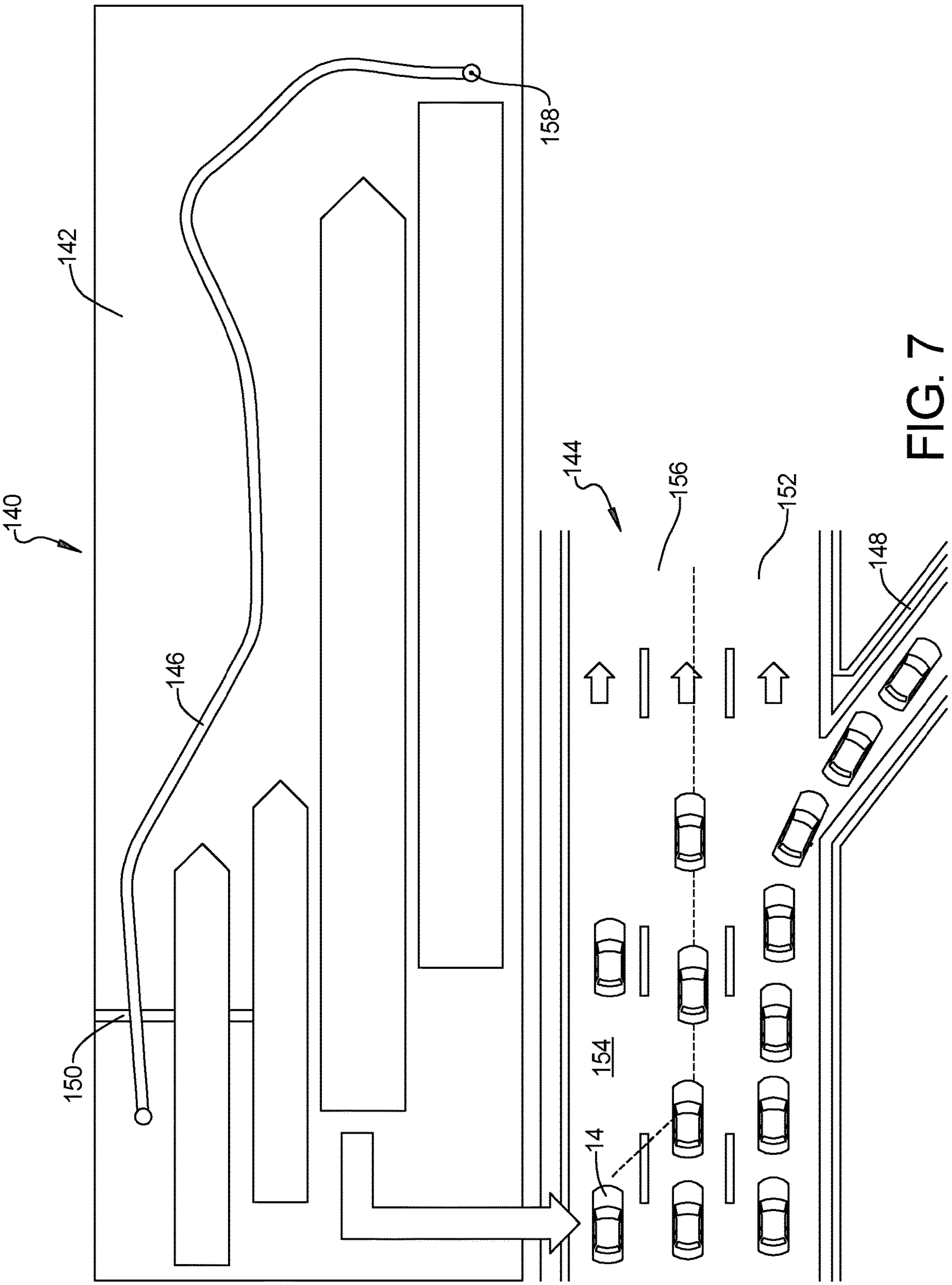
FIG. 7 is a combination road and lane map for the system of FIG. 1.

Referring to FIG. 7 and again to FIGS. 3 through 6 component B of the system to incorporate lane level road congestion to enhance vehicle navigation 10 defining lane level congestion-aware navigation is presented on a combination road and lane map 140 having a map portion 142 and a lane presentation portion 144. Initially, the host vehicle 14 traveling on a predetermined first road 146 should take an exit 148 to change travel paths to a second road 150 to achieve an initial goal travel path. If the host vehicle 14 attempts lane changes but is unable to reach a target or congested lane 152, presently heavily congested, in time to use the exit 148, for example due to congestion ahead of the host vehicle 14 in a current travel lane 154, an intermediate travel lane 156 and the congested target lane 152 the host vehicle 14 in this example misses the exit 148 which adds 5.1 miles of travel distance to reach an original travel end point 158.

Component B defining lane level congestion-aware navigation permits the host vehicle 14 to comprehend the backup or congestion ahead of host vehicle 14 while still traveling on the first road 146. Using this data, the host vehicle 14 may adapt a vehicle speed and/or change to the target lane 152 sooner in time to take the exit 148.

Component C of the system to incorporate lane level road congestion to enhance vehicle navigation 10 defining lane level load balancing is provided to mitigate against a non-congested lane identified by the host vehicle 14 and recommended for a lane change becoming suddenly congested. The load balanced guidance provided by component C is also applied to ensure system recommended lane change advice does not adversely affect lane traffic flow. For example, after directing all vehicle traffic to a non-congested lane route, the previously non-congested lane route may become suddenly congested as other vehicle operators see an opportunity to move into the previously non-congested lane route. Two lane route assignment strategies are provided.

A load balancing method of the present disclosure requires the top K choices of lane route options be based on the shortest-path algorithm outlined above in reference to component B. Disjointed lane routes are preferred over non-disjointed lane routes. The vehicle traffic assignment is randomized across legitimate K options of the lane route. The vehicle route assignment is allocated based on available remaining capacity of each lane route.

Two lane route strategies using the present load balancing method may be applied. In a first or equal strategy, the top K choices of lane route options are identified through an algorithm such as the Dijkstra algorithm or the Bellman-Ford algorithm, using utility-function metrics which are outlined above with respect to component B. Equal weight is assigned to each lane route option. The assignment of an individual vehicle to a particular lane route option is randomized and a probability is assigned wherein the probability Pi.=1/K.

In a second or proportional lane route strategy, the top K choices of lane route options are identified through an algorithm such as the Dijkstra algorithm or the Bellman-Ford algorithm, using utility-function metrics. For each lane route option i ($i \in k$), a designed capacity $C_i$ and its current usage traffic volume $U_i$ are identified. A different weight is assigned to different lane route options based on an available or remaining traffic volume. The assignment of each vehicle to a particular lane route option i is randomized with probability, using equation 3 below:

$$Pi = \frac{(C_i - U_i)}{\sum_{i=1}^{k} (C_i - U_i)} \quad \text{Equation 3}$$

Component D1 of the system to incorporate lane level road congestion to enhance vehicle navigation 10 defining lane level dynamic following distance is provided when a slow-down is identified ahead of the host vehicle 14. When a slow-down is identified the host vehicle 14 dynamically modifies a following distance between the host vehicle 14 and a lead vehicle such as the second vehicle 16 located ahead of the host vehicle 14 in order to prepare for an upcoming deceleration of the second vehicle 16. The increase in following distance allows the host vehicle 14 to plan a longer deceleration profile to be initiated when host vehicle sensors detect the second vehicle 16 is beginning to decelerate.

Figure 8:
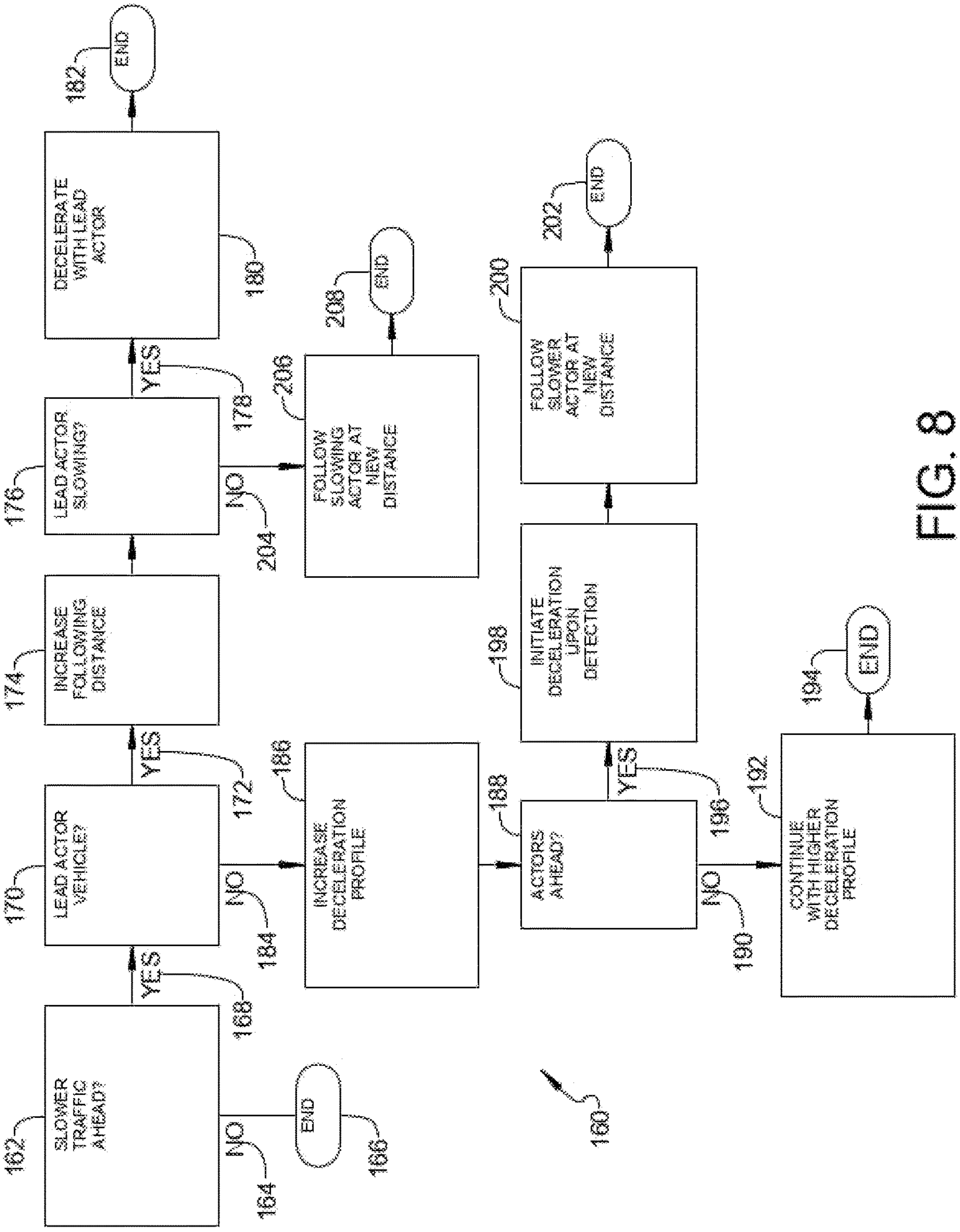
FIG. 8 is a system flow diagram providing dynamic following distance.

Referring to FIG. 8, a system flow diagram 160 identifies steps taken for operation of Component D1 identified above. When a slow-down is identified ahead, the host vehicle 14 will dynamically modify a following distance to the lead or second vehicle 16 in order to prepare for an upcoming deceleration. This increase in following distance allows the host vehicle 14 to plan a longer deceleration profile that will be initiated when the vehicle sensors of the host vehicle 14 detect the lead or second vehicle 16 beginning to decelerate. Initially, a traffic query 162 is made to identify if cloud based data shows that slower traffic is ahead of the host vehicle. If the answer to traffic query 162 is NO 164 the program ends at a first end step 166. If the answer to traffic query 162 is YES 168 a vehicle query 170 is performed which identifies if there is a lead actor vehicle. If a response to the vehicle query 170 is YES 172, an increase command 174 is issued to increase a following distance between the host vehicle 14 and the second vehicle 16 such as the lead actor vehicle. At a time after the increase command 174 is issued an update query 176 is conducted which determines if the lead actor vehicle is slowing. If a response to the update query 176 is YES 178 a deceleration command 180 is issued which commands the host vehicle 14 to decelerate together with the lead actor vehicle while continuing to maintain a following distance. Following the deceleration command 180 the program ends at second end step 182.

If a response to the vehicle query 170 is NO 164 a profile deceleration command 186 is issued which increases a deceleration profile of the host vehicle 14 based on an anticipated or planned deceleration of a speed of traffic reported ahead of the host vehicle 14. Following the profile deceleration command 186 a sensor query 188 is made to identify if sensors of the host vehicle 14 detect other actors or vehicles ahead of the host vehicle 14. If a response to the sensor query 188 is NO 190 a continue command 192 is issued which commands the host vehicle 14 to continue diving with a higher deceleration profile until the host vehicle 14 is past the detected slowdown. If a response to the sensor query 188 is YES 196, an initiate deceleration command 198 is issued which initiates deceleration of the host vehicle 14 upon a first real detection of a slower moving actor or vehicle ahead of the host vehicle 14. At a time after the initiate deceleration command 198 is issued a continuation command 200 is issued which commands the host vehicle 14 to continue following the slower moving actor at a calculated new distance until the host vehicle 14 is past the detected slowdown and the program ends at a third end step 202.

If a response to the update query 176 is NO 204 a continue following command 206 is issued which commands the host vehicle 14 to continue following the slowing actor vehicle at a new calculated distance until the host vehicle 14 is past the slowdown, and the program ends at a fourth end step 208.

Figure 9:
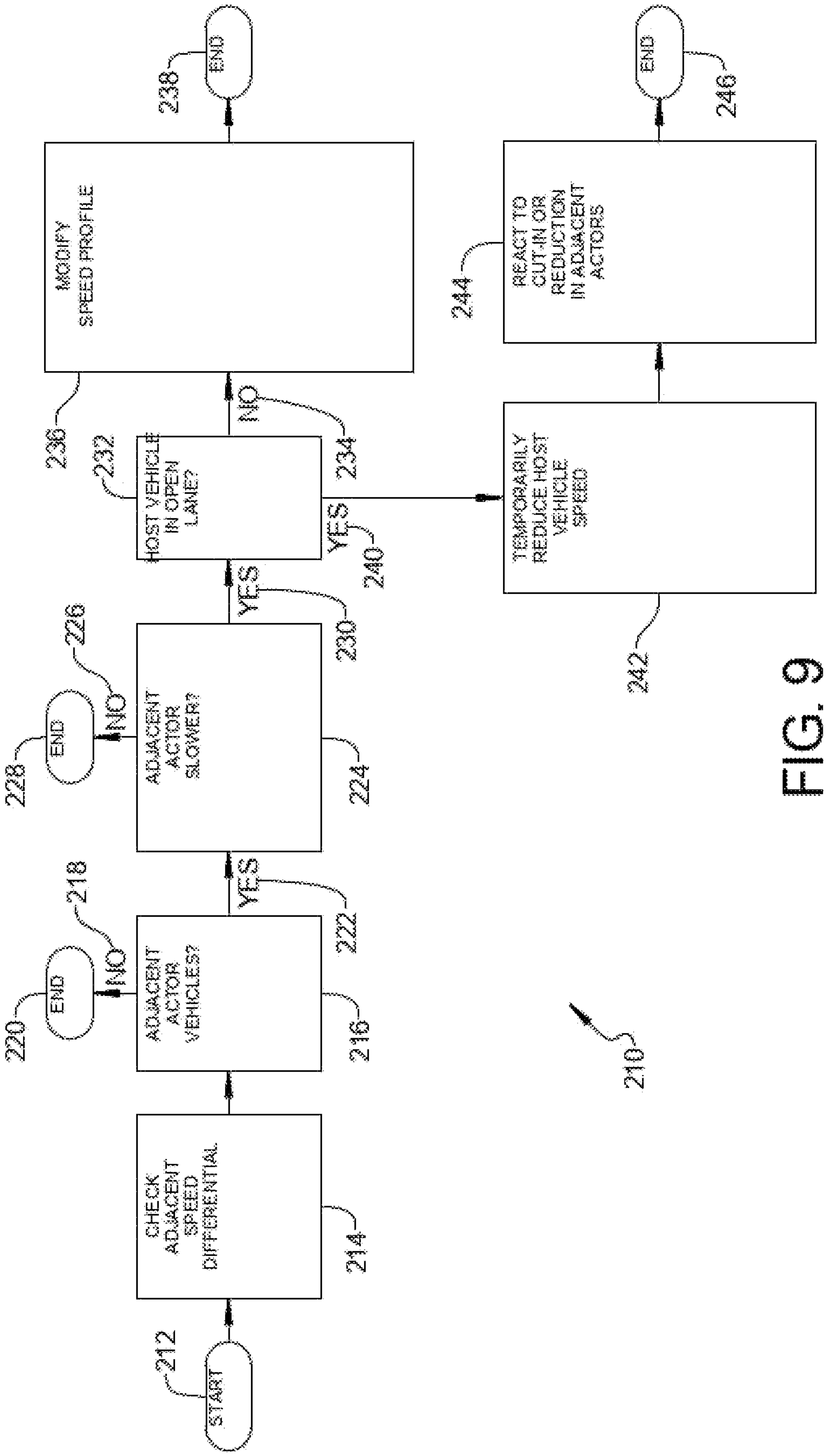
FIG. 9 is a system flow diagram providing lane level speed limitations.

Referring to FIG. 9, a system flow diagram 210 identifies steps taken for operation of Component D2 identified above. Component D2 of the system to incorporate lane level road congestion to enhance vehicle navigation 10 is directed to a lane level dynamic following distance. For a lane-level speed limitation using lane friction, when lane-level traffic data indicates vehicles in the adjacent lane are moving slower than the host vehicle 14 by a predetermined threshold for a predetermined distance, and the presence of slower adjacent traffic is confirmed by the vehicle sensors of the host vehicle 14 a maximum speed of the automated driving system such as the navigation module is limited to a configurable speed differential. An exemplary method for configuring maximum speed differential is to refer to severity ratings based on a collision velocity given within international organization for standardization (ISO) 26262 providing for road vehicles functional safety and align a calibration with the safety integrity level of the automated driving system.

Initially, a program start 212 is conducted and a differential speed query 214 is made to check if a differential speed to adjacent traffic threshold is met. Following the differential speed query 214 an adjacent actor query 216 is made to identify if actor vehicles are adjacent to the host vehicle 14. If a response to the adjacent actor query 216 is NO 218, the program ends at a first program end step 220. If a response to the adjacent actor query 216 is YES 222, a speed determination 224 is conducted to identify if an adjacent actor vehicle is moving the host vehicle speed or a host vehicle set speed. If a response to the speed determination 224 is NO 226, the program ends at a second end step 228. If a response to the speed determination 224 is YES 230 a host vehicle lane query 232 is conducted to identify if the host vehicle 14 is in an open lane. If a response to the host vehicle lane query 232 is NO 234 a modify speed profile command 236 is generated and the program ends at a third end step 238. If a response to the host vehicle lane query 232 is YES 240 a speed reduction command 242 is generated to temporarily reduce a speed of the host vehicle 14 to a predetermined differential of an adjacent actor speed. Following the speed reduction command 242 a reaction command 244 is generated which allows the host vehicle 14 to react to any cut or reduction in a quantity of adjacent actor vehicles and the program ends at a fourth end step 246.

Figure 10:
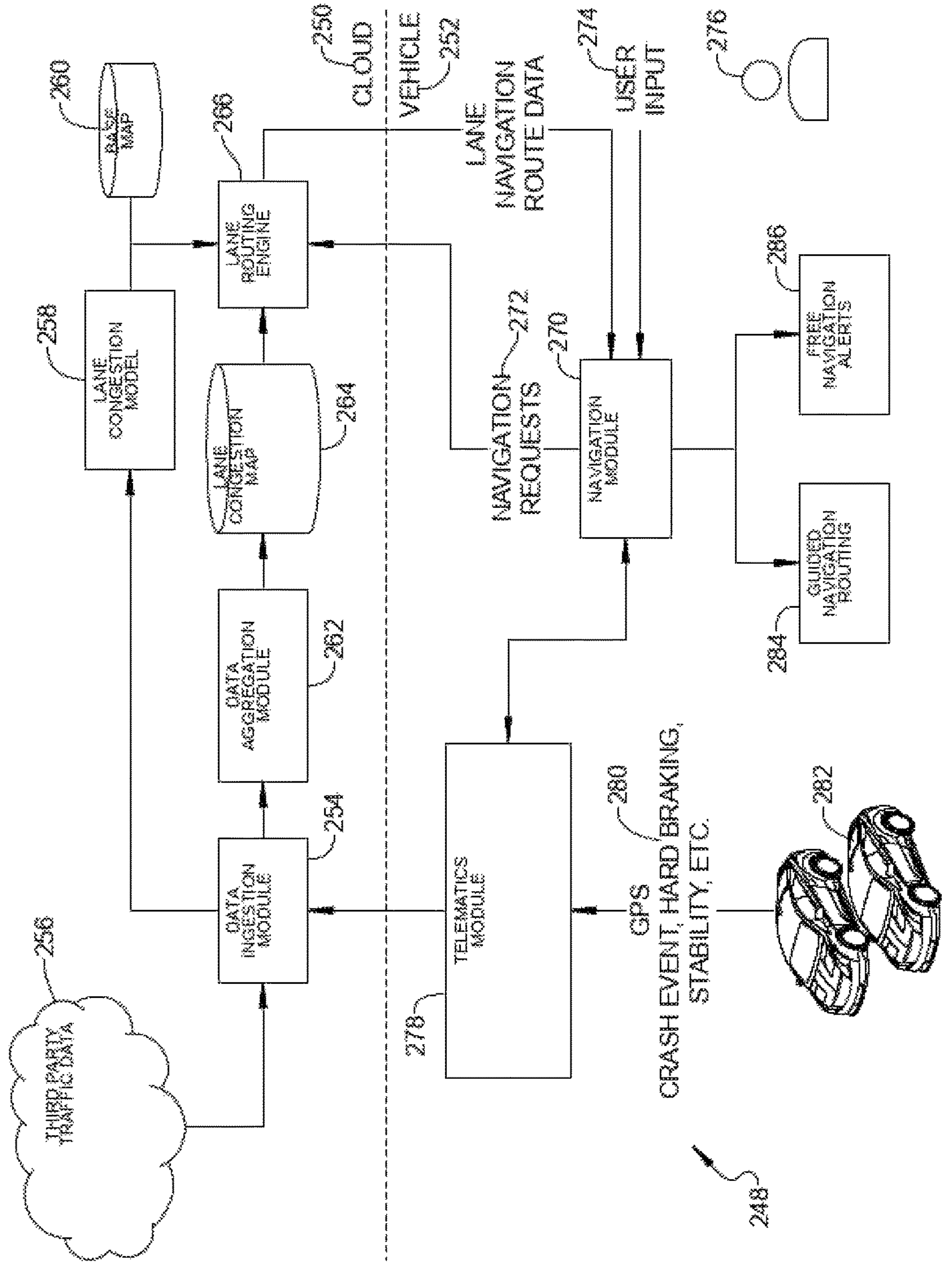
FIG. 10 is a system block diagram for the system of FIG. 1.

Referring to FIG. 10, a system block diagram 248 provides portions of the system to incorporate lane level road congestion to enhance vehicle navigation 10 in a cloud computing network 250 and within a vehicle 252 such as the host vehicle 14. Within the cloud computing network 250 a data ingestion module 254 collects system sensor data including third party traffic data 256. A first output of the data ingestion module 254 is directed to a lane congestion model 258. The lane congestion model 258 may also receive data from a base map 260. A second output of the data ingestion module 254 is directed to a data aggregation module 262 and an output of the data aggregation module 262 is directed to a lane congestion map 264 which identifies individual road lanes having differing levels of congestion, including non-congested lanes, busy or heavy traffic lanes and one or more congested lanes wherein traffic may be stopped or slowed to a minimal speed for example when slowing to force vehicles into fewer lanes such as at construction zones. An output of the lane congestion map 264 is directed to a lane routing engine 266 and an output of the lane congestion model 258 is also directed to the lane routing engine 266. The lane routing engine 266 identifies possible routes and route changes for the host vehicle 14 to apply to improve the vehicle TT.

With further reference to FIG. 10, data is exchanged between the cloud computing network 250 and the vehicle 252, for example by wireless data transmission. Components of the vehicle 252 are hereinafter identified, together with information and data exchanges with the cloud computing network 250. For example an output of the lane routing engine 266 defining lane navigation route data 268 is forwarded to a navigation module 270. Navigation requests 272 are forwarded from the navigation module 270 to the lane routing engine 266 and may be returned as the lane navigation route data 268. The navigation module 270 also receives user input 274 provided by a vehicle user 276 or operator.

The vehicle 252 further includes a telematics module 278 which may communicate via a global navigation satellite system (GNSS) and using vehicle-to-network (V2N) communication protocols with the navigation module 270. The telematics module 278 is responsible in part to perform data collection tasks. For example, the telematics module 278 may receive GPS data, crash event data, hard braking data and stability data, all collectively defining vehicle data 280 from a crowd sourced vehicle fleet 282. An output of the navigation module 270 may also define guided navigation routing information 284 and free navigation alerts 286.

According to several aspects, the method of the present disclosure provides use of a large volume of vehicle data and advanced algorithms to achieve lane-level congestion identification. The method of the present disclosure applies the lane-level congestion plus comfort measures to assist vehicle decision making, including making AV navigation decisions. The method of the present disclosure performing a trade-off analysis between a shortest travel time which may include multiple vehicle lane changes to accomplish to minimize an impact of one or more road congestion locations ahead of the host vehicle, and customer comfort which is improved by reducing or minimizing a quantity of vehicle lane changes. The method of the present disclosure also provides an enhancement to human machine interfaces (HMIs). According to several aspects, a lane route option is provided to different vehicles based on load balancing among different available options. According to several aspects, headway dynamics and speed advisory information are provided based on lane-level traffic dynamics and traffic dynamics of adjacent lanes.

The system to incorporate lane level road congestion to enhance vehicle navigation 10 of the present disclosure also provides a method to perform lane level distribution, clustering and analysis against a non-congested lane profile. The method to perform lane level congestion prediction may apply a Markov Chain process to identify a vehicle arrival and provide a system steady state estimation. The method also includes performance of a trade-off analysis between an estimated time of arrival of the host vehicle and determination of lane change count maneuvers made during travel, used to minimize lane changes which ensure operator or user comfort.

A system to incorporate lane level road congestion to enhance vehicle navigation 10 of the present disclosure offers several advantages. These include provision of lane-level congestion and comfort measures to assist navigation decision making. These include selection of a travel lane that best matches a customer preference and avoids traffic congestion. Also included is an input to a behavior planning module to ensure successful AV navigation to a vehicle exit ramp.

What is claimed is:

1. A method to incorporate road congestion for enhanced vehicle navigation, comprising:

conducting an analysis of a current distribution of multiple vehicles in front of or proximate to a host vehicle traveling on a road having multiple vehicle lanes;

assessing a vehicle clustering of at least one of the multiple vehicle lanes forward of the host vehicle;

comparing results of the analysis and the vehicle clustering to a non-congested vehicle lane profile to distinguish a lane level distribution of the multiple vehicles in front of or proximate to the host vehicle;

generating a prediction of at least one congested lane ahead of the host vehicle using the lane level distribution;

carrying out a trade-off analysis providing an estimated travel time (TT) of the host vehicle to a predetermined destination including predicting a total quantity of lane change maneuvers required by the host vehicle to minimize interaction with the at least one congested lane until reaching the predetermined destination;

directing a first or component A to issue a lane level congestion notification to a user or an operator of the host vehicle;

providing a second or component B to perform lane level congestion-aware navigation;

incorporating a third or component C to perform lane level load balancing; and including a fourth or component D directed to maintaining a lane level dynamic following distance, wherein component D includes:

identifying at least one vehicle defining a lead actor vehicle ahead of the host vehicle moving slower than the host vehicle defining a slowdown of vehicle traffic;

increasing a deceleration profile for the host vehicle based on a planned deceleration of the lead actor vehicle;

operating sensors of the host vehicle to detect the lead actor vehicle;

and initiating a deceleration of the host vehicle upon initial detection of the lead actor vehicle.

2. The method of claim 1, further including predicting the at least one congested lane using a process including a chain process.

3. The method of claim 2, further including determining a system steady state estimation.

4. The method of claim 1, further including incorporating first and second lane selection functions including:

selecting a travel lane of the host vehicle in a first lane selection function based on both saved or input habits of a user of the host vehicle and a comfort level of the user of the host vehicle; and developing a lane selection in a second lane selection function, based on planning data developed to prepare to exit the host vehicle at an upcoming road exit.

5. The method of claim 1, further including providing visual indications of road segment congestion to a user of the host vehicle using multiple segments individually having a distinct color and a line width together indicating a non-congested condition, an increased congestion condition and a congested condition, the host vehicle automatically adjusting a driving path in view of the visual indications of road segment congestion.

6. The method of claim 1, wherein component D further includes:

modifying a follow distance between the host vehicle and the lead actor vehicle; and continuing to follow the lead actor vehicle at the follow distance until after the host vehicle reaches the slow-down of vehicle traffic ahead of the host vehicle.

7. The method of claim 6, wherein component C further includes:

performing a lane level load balancing to mitigate against the non-congested lane identified by the host vehicle becoming congested; and creating multiple lane route options for multiple vehicles on the road including the host vehicle.

8. The method of claim 7, wherein component C further includes:

applying an equal lane route strategy to create the multiple lane route options, wherein top choices of the multiple lane route options are identified through an algorithm;

applying utility-function metrics wherein an equal weight is assigned to individual ones of the multiple lane route options;

randomizing the multiple lane route options and assigning a probability to individual ones of the multiple lane route options; and assigning one of the multiple vehicles to one of the multiple lane route options.

9. The method of claim 7, wherein component C further includes:

applying a proportional lane route strategy to create the multiple lane route options wherein the multiple lane route options are identified through an algorithm;

using utility-function metrics including identifying for individual ones of the multiple lane route options a designed capacity and a current usage traffic volume;

assigning a different weight to different ones of the multiple lane route options based on an available traffic volume; and randomizing assignment of a probability to an individual one of the multiple vehicles and one of the multiple lane route options.

10. The method of claim 7, wherein component A further includes:

providing individualized lane guidance to road users based on detected traffic distribution of lanes on the road to maximize traffic flow through the congested area;

presenting lane profile data to the road users for consideration or to be used by autonomous vehicles as part of a vehicle behavior planning;

presenting a road map depicting a predetermined portion of the road for vehicle travel having multiple lanes;

depicting one or more congestion symbols on the road map when the congested area is identified in the predetermined portion of the road; and presenting a recommended vehicle travel path into one of the multiple lanes representing a recommended travel lane to minimize travel disruption in the congested area.

11. The method of claim 10, further including:

projecting at least one travel delay symbol and at least one estimated travel time (TT) symbol on the road map if the congested area is identified in the predetermined portion of the road; and identifying multiple lane changes to maximize vehicle travel through the congested area.

12. The method of claim 10, further including:

identifying a selected one of a first lane, a second lane and a third lane as the recommended travel lane on the predetermined portion of the road; and visually presenting directional indicators directed toward the recommended travel lane on individual ones of the first lane, the second lane and the third lane not identified as the recommended travel lane.

13. The method of claim 1, wherein component D further includes:

identifying a slowing vehicle defining a lead actor vehicle ahead of the host vehicle; and decelerating the host vehicle while maintaining a following distance to the lead actor vehicle.

14. The method of claim 1, wherein the trade-off analysis further comprises performing the trade-off analysis between a shortest travel time having multiple vehicle lane changes to accomplish to minimize an impact of one or more road congestion locations ahead of the host vehicle, and a customer comfort maximized by minimizing a quantity of the vehicle lane changes and by a trade-off through a utility function combining the travel time or the estimated time of arrival and the customer comfort together.

* * * * *